United States Patent
Zeng et al.

(10) Patent No.: US 10,190,487 B1
(45) Date of Patent: Jan. 29, 2019

(54) SYSTEMS AND METHODS FOR A BI-VALVED VARIABLE INLET DEVICE

(71) Applicant: Ford Global Technologies, LLC, Dearborn, MI (US)

(72) Inventors: Tao Zeng, Bloomfield Hills, MI (US); Leon Hu, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/804,397

(22) Filed: Nov. 6, 2017

(51) Int. Cl.
| | |
|---|---|
| *F02B 39/16* | (2006.01) |
| *F02B 37/22* | (2006.01) |
| *F04D 27/00* | (2006.01) |
| *F02D 41/00* | (2006.01) |
| *F02D 41/26* | (2006.01) |
| *F02B 39/04* | (2006.01) |
| *F02B 39/10* | (2006.01) |
| *F04D 17/10* | (2006.01) |
| *F02B 33/40* | (2006.01) |

(52) U.S. Cl.
CPC .......... *F02B 37/225* (2013.01); *F02B 39/16* (2013.01); *F02D 41/0007* (2013.01); *F04D 27/002* (2013.01); *F02B 33/40* (2013.01); *F02B 39/04* (2013.01); *F02B 39/10* (2013.01); *F02D 41/26* (2013.01); *F04D 17/10* (2013.01)

(58) Field of Classification Search
CPC ........ F02B 39/16; F02B 37/225; F02B 33/40; F02B 39/04; F02B 39/10; F02D 41/007; F02D 41/26; F04D 27/002; F04D 17/10
See application file for complete search history.

(56) References Cited

U.S. PATENT DOCUMENTS

| | | | |
|---|---|---|---|
| 4,856,962 A | 8/1989 | McDow | |
| 5,867,979 A * | 2/1999 | Newton | F02C 3/113 310/90.5 |
| 6,332,313 B1 * | 12/2001 | Willis | F23R 3/14 60/39.23 |
| 6,679,057 B2 | 1/2004 | Arnold | |
| 7,246,490 B2 * | 7/2007 | Sumser | F02B 37/04 60/605.2 |
| 8,683,799 B2 * | 4/2014 | Azuma | F02B 37/24 60/602 |

(Continued)

FOREIGN PATENT DOCUMENTS

| | | |
|---|---|---|
| EP | 2017434 A2 | 1/2009 |
| EP | 2024645 B1 | 10/2010 |

OTHER PUBLICATIONS

Zeng, Tao et al., "Systems and Method for a Variable Inlet Device of a Compressor," U.S. Appl. No. 15/700,995, filed Sep. 11, 2017, 67 pages.

(Continued)

*Primary Examiner* — Hieu T Vo
(74) *Attorney, Agent, or Firm* — Julia Voutyras; McCoy Russell LLP (57) ABSTRACT

Methods and systems are provided for a variable inlet device of a compressor. In one example, a compressor may include the variable inlet device arranged within an inlet conduit of the compressor. The variable inlet device may be adjustable to control the gas flow through the compressor, the variable inlet including a pair of semi-cylindrical shells that are pivotable, about a set of hinges, between an open and closed position.

20 Claims, 6 Drawing Sheets

(56) References Cited

U.S. PATENT DOCUMENTS

| | | |
|---|---|---|
| 9,200,640 B2 | 12/2015 | Patil |
| 2010/0172745 A1 | 7/2010 | Hodder |
| 2012/0114463 A1* | 5/2012 | Beers ................. F04D 25/0606 |
| | | 415/151 |
| 2012/0263586 A1 | 10/2012 | Patil |

OTHER PUBLICATIONS

Zeng, Tao et al., "Systems and Method for a Variable Inlet Device of a Compressor," U.S. Appl. No. 15/701,050, filed Sep. 11, 2017, 65 pages.

\* cited by examiner

SYSTEMS AND METHODS FOR A BI-VALVED VARIABLE INLET DEVICE

FIELD

The present description relates generally to methods and systems for a variable inlet device of a compressor and controlling the variable inlet device to adjust airflow entering the compressor.

BACKGROUND/SUMMARY

By forcing extra air into the engine, as realized during the late $19^{th}$ century by Gottlieb Daimler, a turbocharger may increase engine torque and power output density. The turbocharger may include a turbine driven by expanding exhaust gas that is coupled to a compressor via a drive shaft. The compressor may be fluidly coupled to an air intake manifold in the engine connected to a plurality of engine cylinders. The flow of exhaust originating at one or more of the engine cylinders may be directed to a turbine wheel, driving the rotation of the turbine about a fixed axis. The rotation of the turbine drives the rotation of an impeller (e.g., wheel) of the compressor which compresses air into the air intake manifold to increase boost pressure based on engine operating conditions.

Compressor efficiency influences overall engine performance and fuel consumption. For example, lower compressor efficiency may result in slow engine transient response and higher fuel consumption for both steady-state and transient engine operation. At lighter engine loads, when compressor efficiency is reduced, increased turbocharger lag may result during a tip-in. Additionally, light load operation may result in lower compressor efficiency and compressor surge limits may restrict boost pressure rise at low engine speeds.

Other attempts to address low compressor efficiency include a compressor configured with adjustable inlet guide vanes. One example approach is shown by Hodder in U.S. Patent Application Publication No. 2010/0172745 A1. Therein, a rack and pinion drive mechanism for the adjustment of inlet guide vanes of a compressor is disclosed. The mechanism is positioned within the compressor casing and surrounds a shaft connected to an impeller of the compressor. A ring with a plurality of slots is adapted to couple with a plurality of lever arm assemblies, each having a pin, so that the pins are positioned within each of the slots. A plurality of vanes are coupled to an end of each lever arm with a pinion coupled to the shaft of one of the vanes, acting as a drive vane. The drive vane is configured to rotate a ring via the rack and pinion drive mechanism, thereby pivoting the inlet guide vanes and adjusting the flow of gas through the vanes.

However, the inventors herein have recognized potential issues with such systems. As one example, even in the open position, due to the orientation and pivoting direction of these vanes, flow through the variable inlet device and to the impeller is restricted (e.g., partially blocked). As a result, this type of variable inlet has reduced high end efficiency and constrains high end intake air flow.

In one example, the issues described above may be addressed by a compressor comprising an impeller rotatable about a central axis and an inlet conduit including a variable inlet device (VID) positioned therein, upstream of the impeller. The VID may include a set of semi-cylindrical shells connected to a base that forms a ring around the central axis with inner surfaces of the shells forming a flow passage through the VID, each of the shells being pivotable about a hinge arranged at a mid-point of an inlet edge of each shell, between an open and closed position. In the open position, the inner surfaces of the shells form a uniform flow passage with reduced flow restriction. In the closed position, the shells may be angled so that a diameter of the outlet end is smaller than a diameter of the inlet end of the VID, thereby restricting flow as the flow passes through the flow passage of the VID. As a result, compressor efficiency is increased in the closed position due to the restricted flow that is generated by the VID. Compressor efficiency is further increased at higher loads when the VID is in the open position due to reduced flow restriction through the inlet conduit and VID. In this way, compressor efficiency and overall engine performance and fuel economy may be increased across a wide range of engine operating speeds and loads.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-3D are shown approximately to scale.

DETAILED DESCRIPTION

Figure 2A:
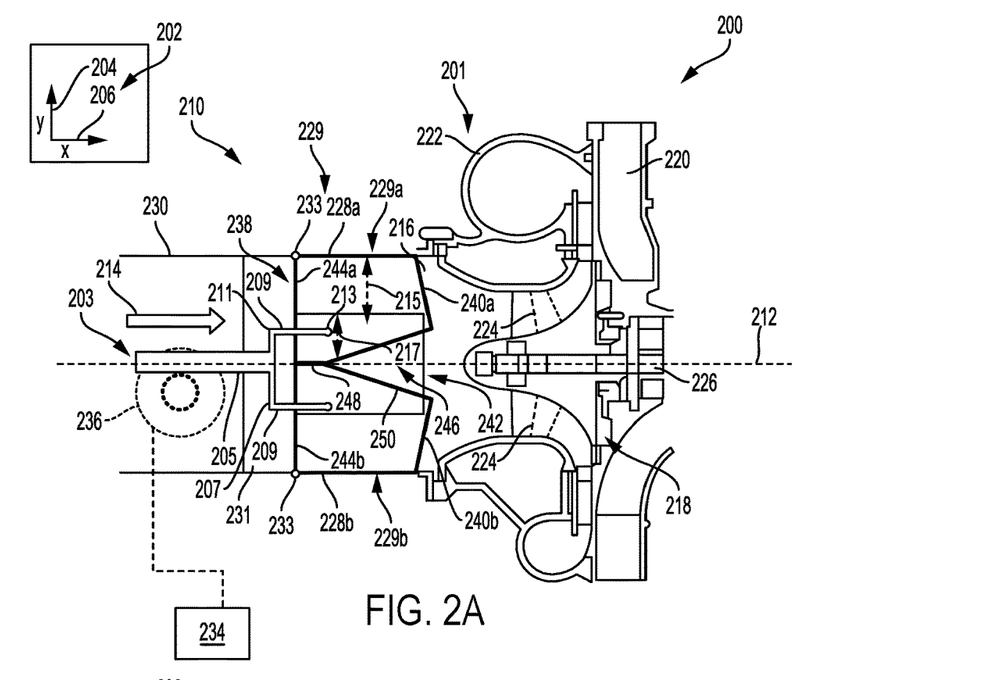
FIGS. 2A-2B show a cut-away view of a turbocharger compressor including a variable inlet device positioned in an inlet conduit of the compressor.
Figure 2B:
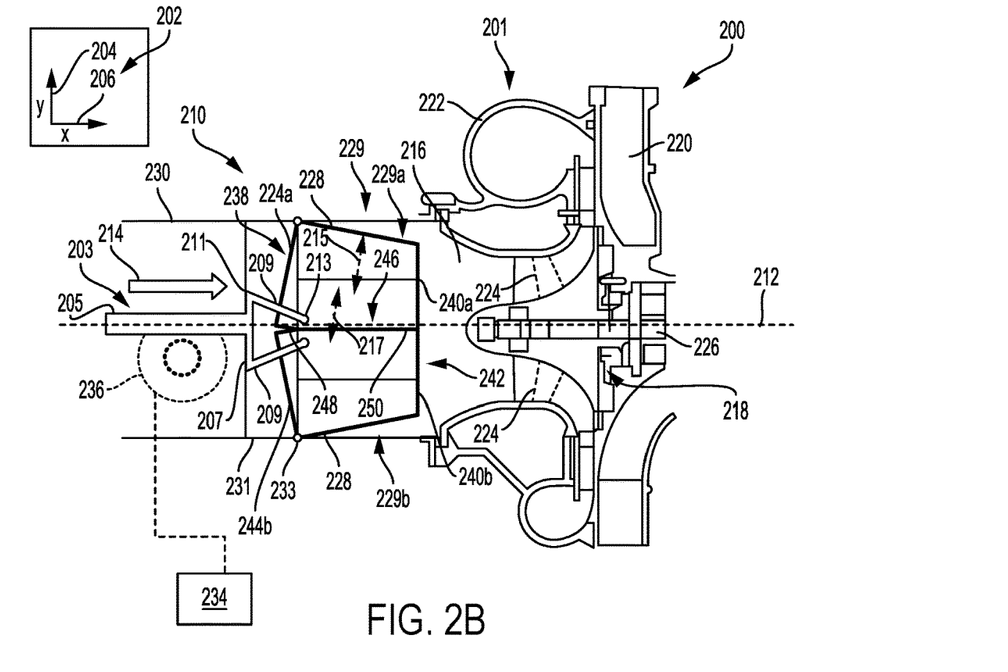
Figure 3A:
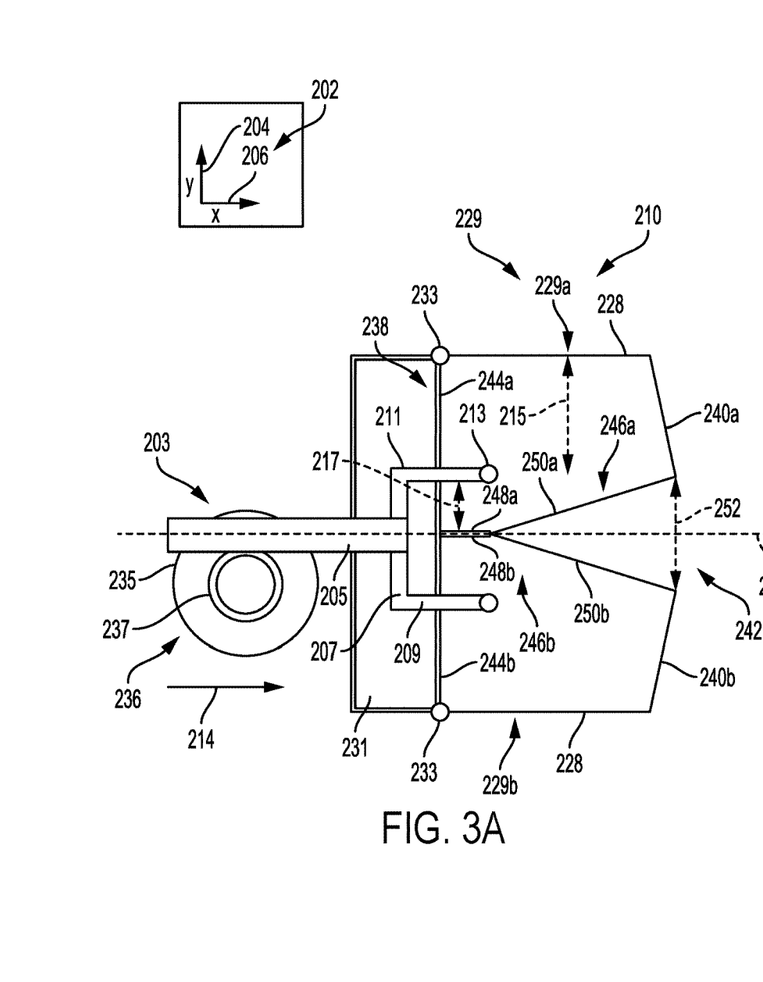
FIGS. 3A-3D show an exemplary variable inlet device for a turbocharger compressor in open and closed positions from profile and front views.
Figure 3B:
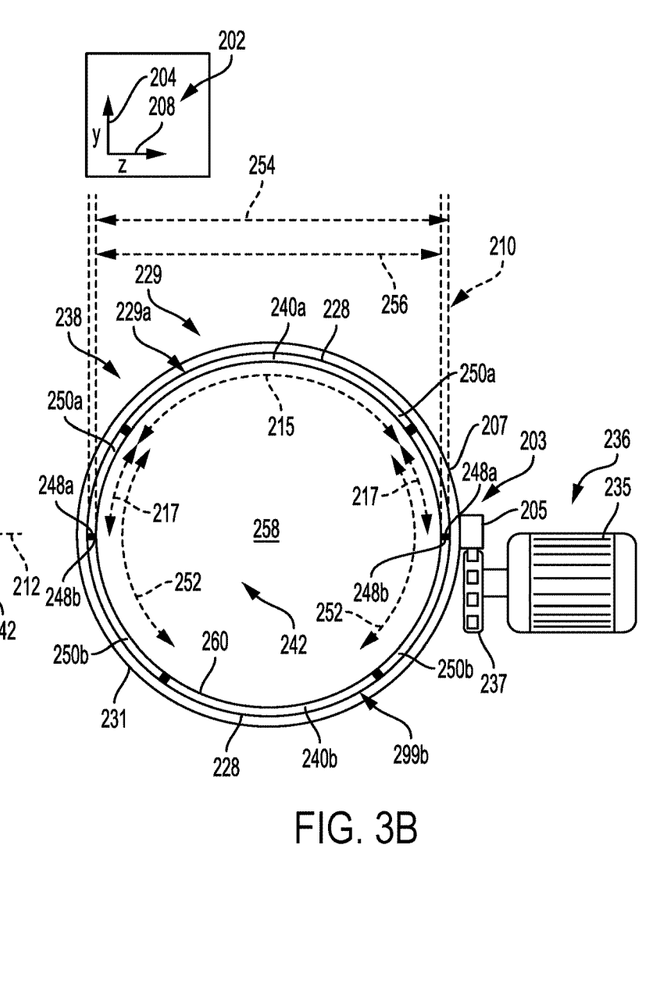
Figure 3C:
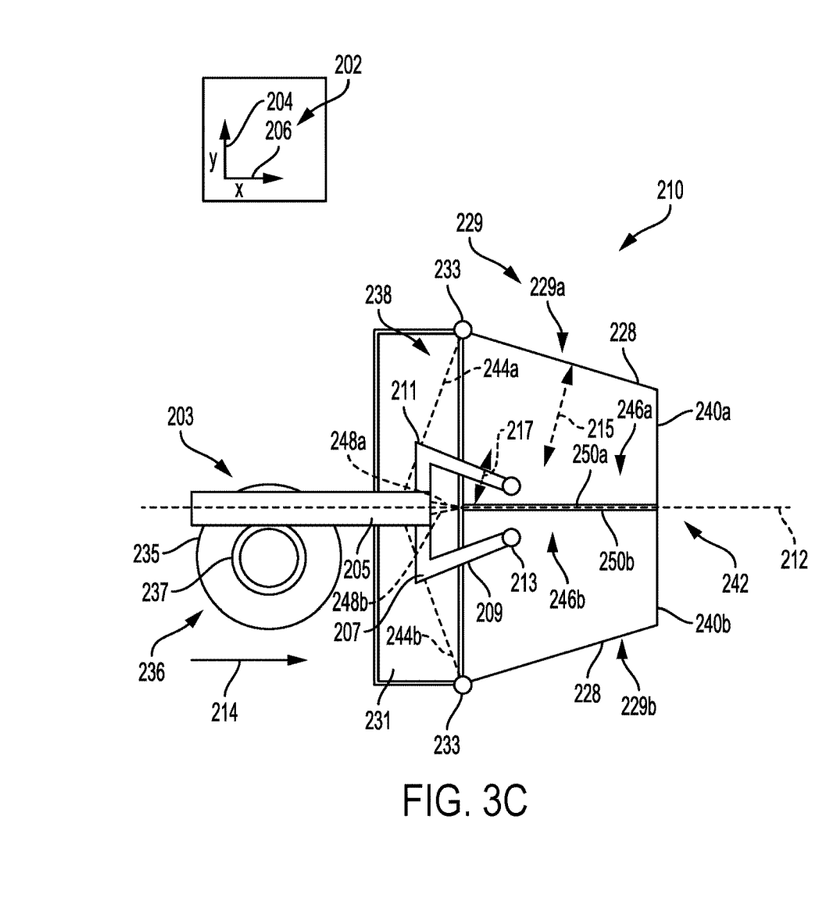
Figure 3D:
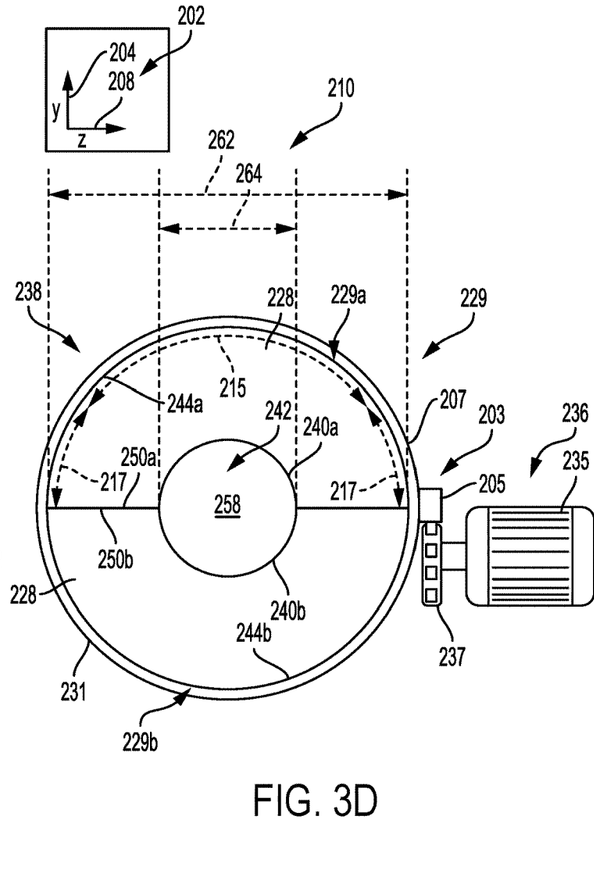
Figure 5:
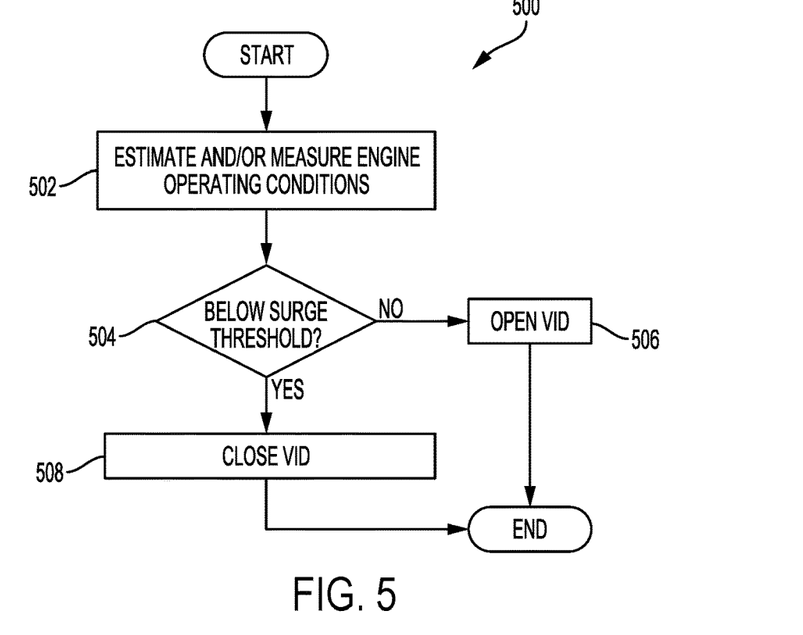
FIG. 5 shows a flow chart of a method for controlling a position of a variable inlet device.
Figure 6:
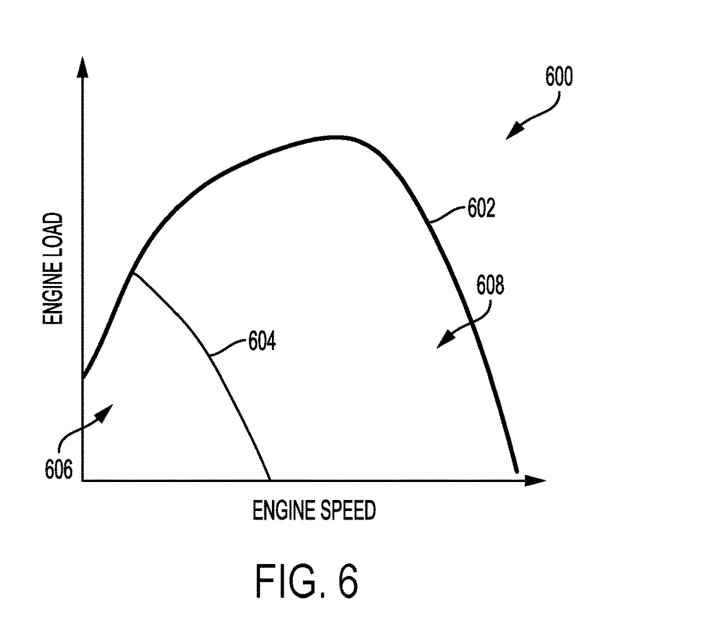
FIG. 6 shows an engine load and engine speed map for controlling a position of a variable inlet device.

The following description relates to systems and methods for a variable inlet device of a turbocharger compressor. A compressor of a turbocharger, such as the compressor of the engine system shown in FIG. 1, may be positioned in an intake passage of an engine. The compressor may include an inlet conduit (e.g., intake passage) and an impeller (e.g., compressor wheel) disposed downstream in the inlet conduit. The impeller may include one or more blades and is rotatable about a central axis of the compressor. As shown in FIGS. 2A-2B a variable inlet device (VID) may be disposed within the inlet conduit of the compressor, upstream of the impeller. The VID may be adjustable between an open position, as shown in FIGS. 2A, 3A, and 3B, depicted from a profile view in FIG. 3A and from a front view of the VID in FIG. 3B. Similarly, profile and top views of the VID are provided in FIGS. 3C and 3D with the VID in a closed position, as shown in FIGS. 2B, 3C, and 3D. The VID includes a set of adjacently arranged semi-cylindrical shells, resembling the exostructure of a bi-valved organism, positioned in an inlet conduit of the compressor so that the outer surfaces of the shells may be in contact an inner wall of the inlet conduit. The shells are pivotable about a set of hinges, toward and away from the central axis, between the open and closed positions. When the VID is in the open position, the inner surfaces of the shells restrict flow through the VID and inlet conduit less than when the VID is in the closed position. Conversely, when the VID is in the closed position, the shells are pivoted so that a flow passage of the VID formed by the inner surfaces of the shells narrows from the inlet end to the outlet end. The shape of an individual shell of the VID is illustrated in further detail in FIG. 4. As shown in FIGS. 5 and 6, the position of the VID may be controlled based on engine load and engine speed conditions relative to a surge threshold. In this way, a VID for a compressor may be used to increase compressor efficiency at different operating conditions, such as lighter load conditions.

Figure 1:
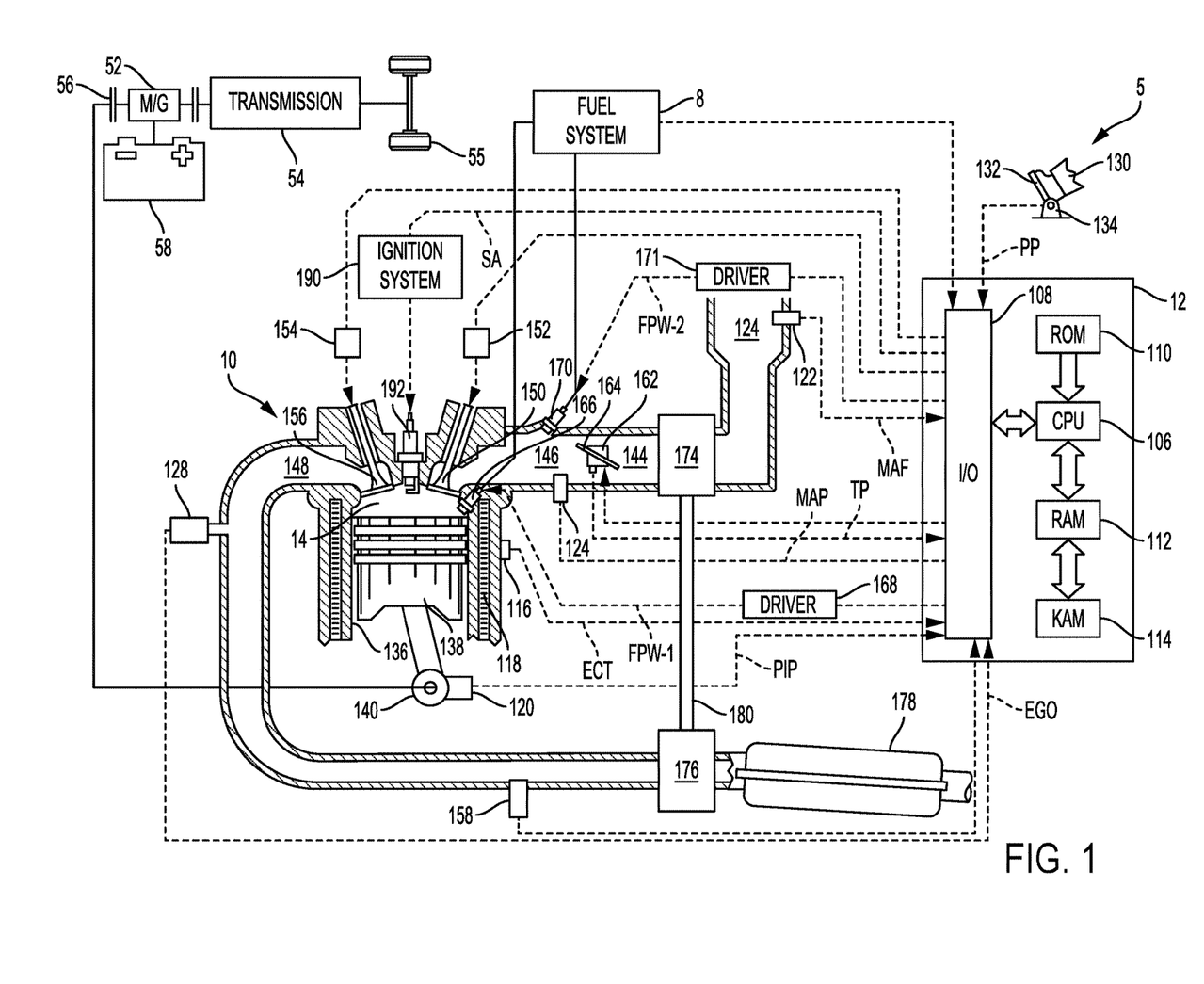
FIG. 1 shows a schematic depiction of an exemplary vehicle system.

Turning now to FIG. 1, an example embodiment of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of catalyst 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, upon receiving signals from various sensors, the engine controller may send control signals to an actuator to alter the position of a variable inlet device (VID) of the compressor 174. The signal may tell an actuator of the VID to adjust the VID from an open to a closed position or a closed to an open position in response to a current engine speed and engine load relative to a surge threshold and/or choke threshold of the compressor.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The incorporation of a turbocharger in engine 10 may significantly improve engine performance by increasing the amount of air, and thus fuel, supplied to the cylinders, with reference to cylinder 14. This may be achieved by the compressor 174, driven by the turbine 176, forcing compressed air into the intake manifold of the engine 10. Issues with engine efficiency, however, may arise during engine operation under low end flow, leading to surge conditions. This problem may be mitigated by including a variable inlet device (VID), such as the VID 210 shown FIGS. 2A-3D, discussed in further detail in the following descriptions.

In FIGS. 2A-2B, a schematic 200 of a cut-away (e.g., cross-sectional) views of a compressor 201, including the variable inlet device (VID) 210, are depicted. In one embodiment, compressor 201 may be compressor 174 of FIG. 1. A set of reference axes 202 is provided for comparison of views shown, indicating a "y" vertical direction 204 and an "x" horizontal direction 206. A central axis 212 of the compressor 201 is included, about which an impeller 218 is rotatable. Central axis 212 may also be a central axis of an inlet conduit 216 of the compressor 201, and the direction of gas flow through the compressor is indicated by an arrow 214. Elements of compressor 201 may be described in the direction of gas flow 214 through the compressor 201 and any element in the path of gas flow relative to a reference point is considered downstream of the reference point. Conversely any element positioned in the reverse direction of gas flow relative to a reference point is upstream of the reference point.

Compressor 201 may include the inlet conduit 216, the impeller 218, a diffuser 220, and a volute 222. The impeller 218 may have a plurality of impeller blades 224 and be connected to a turbine via a shaft 226 that drives the rotation of the impeller 218 around the central axis 212 of the compressor 201. Gas flow (e.g., intake air from an intake passage such as intake passage 142 shown in FIG. 1) may be drawn into the inlet conduit 216 due to the rotation of the impeller 218 and flow through the VID 210, arranged upstream of impeller 218, before continuing past the impeller 218, accelerating through the diffuser 220, and collecting in the volute 222. Deceleration of gas flow in the volute 222 may cause an increase in pressure in the volute 222, resulting in gas flow to the intake manifold.

The gas flow to the intake manifold may be varied by the operation of the VID 210 within the inlet conduit 216 of the compressor 201. In the absence of the VID 210, flow through the compressor may be a function of the amount of air drawn in through the intake passage, such as intake passage 142 of FIG. 1, without any additional control of the amount of gas entering the compressor 201. The arrangement of the VID 210 in the direct path of gas flow may thus have a substantial impact on regulating flow through the compressor 201, adjustable according to engine operating conditions.

Specific details of the orientation and geometry of the VID 210 will now be described. As shown in FIGS. 2A-2B, the VID 210 spans across an entirety of the inlet conduit 216. VID 210 includes a pair of shells 229, including a first shell 229a and a second shell 229b. The pair of shells 229 have outer surfaces 228 that together form a passage centered about the central axis 212 through which intake air may flow. Specifically, the outer surfaces 228 of the pair of shells 229 may be in contact with an inner wall 230 of the inlet conduit 216 when the VID 210 is in the open position, as shown in FIG. 2A. Additionally, an entirety of VID 210 is arranged upstream of an entirety of impeller 218, including a leading edge of the impeller blades 224. An electric motor 236, in electronic communication with a controller 234 (which may be the same as or similar to the controller 12 shown in FIG. 1), is mechanically coupled to a bar mechanism 203. Based on one or more electronic signals received from the controller 234, the electronic motor 236 may be instructed to pivot a set of arms 209 of the bar mechanism 203 that are coupled to the VID 210 to actuate the VID 210 between open and closed positions.

Other actuators and motors are conceivable for the operation of the VID 210 but the bar mechanism 203 may be a suitable actuating device for the bi-valved configuration of the VID 210. The bar mechanism 203 may include a stem 205, aligned with the central axis 212 of the compressor 201, that is connected at an end to a mid-point of a connecting bar 207, arranged perpendicular to the central axis 212. The set of arms 209 may be attached at a set of first ends 211 to the connecting bar 207 and at a set of second ends 213 to the pair of shells 229 of the VID 210. The arms 209 may be rotated about joints between the first ends 211 and the connecting bar 207 so that the second ends 213 of the arms 209 may pivot towards and away from the central axis 212.

FIG. 2A shows a first schematic 200 of compressor 201 and VID 210 in the open position. In the open position, the second ends 213 of the arms 209 of VID 10 are pivoted away from the central axis 212. First shell 229a includes a first outlet shell end 240a and second shell 229b includes a second outlet shell end 240b. Both the first and second outlet shell ends 240a and 240b are arranged at an outlet end 242 of the VID 210. The outlet end 242, as well as the first and second outlet shell ends 240a and 240b, may be arranged downstream in the inlet conduit 216 of the inlet end 238. The inlet end 238 may comprise a first inlet shell end 244a of the first shell 229a and a second inlet shell end 244b of the second shell 229b. The pair of shells 229 may be attached to a base 231 of the VID 210 via a set of hinges 233 that may be arranged opposite of one another in the circumference of the base 231. The set of hinges 233 may be positioned at mid-points along the first and second inlet shell ends 244a and 244b. In the open position, the outer surfaces 228 of the pair of shells 229 may be in face-sharing contact with the inner wall 230 of the inlet conduit 216, forming an inner channel through the VID 210 that may be uniform in diameter from the inlet end 238 to the outlet end 242.

The pair of shells 229 of the VID 210 may have shapes that enable adjustment of the geometry of the inner channel formed by the pair of shells 229 for desired effects on flow. Both the first shell 229a and the second shell 229b of the VID 210 may have a central region 215 and two side regions 217 arranged on either side of the central region 215, which is illustrated in greater detail in FIG. 4. The central region 215 extends in a straight line from the inlet end 238 to the outlet end 242 of the VID 210. The side regions 217 are spaced apart from one another on sides opposite the central region 215 and may each have a side wall 246, and each side wall 246 is also a side wall 246 of one of the pair of shells 229. As each shell of the pair of shells 229 has two side regions 217 and each side region of the two side regions has the side wall 246, then each shell of the pair of shells 229 has more than one side wall 246, e.g., each shell of the pair of shells 229 has a first side wall 246 and a second side wall 246. In the schematic 200 illustrated in FIGS. 2A-2B, only the first side wall 246 is shown and thus the ensuing discussion will be in reference to the visible first side wall 246 of both the first shell 229a and second shell 229b. It will be appreciated, however, that the narrative is also representative of the second side wall 246 of each of the pair of shells 229 that is not shown.

The elements of the first side wall 246 will now be described with reference the VID 210 in the open configuration, as shown in FIG. 2A, and to the first shell 229a of the pair of shells 229 for simplicity. It will be appreciated that the description may similarly describe the second shell 229b. A first portion 248 of the first side wall 246 may extend coaxially with the central axis 212 from the inlet end 238 to a mid-point along the length of the VID 210. A second portion 250 may extend from end of the first portion 248, at the mid-point along the length of the VID 210, to the outlet end 242 of the VID 210. The second portion 250 may be angled so that the second portion 250 is angled away from the central axis 212 at the outlet end 242 of the VID 210 and connects the first portion 248 of the first side wall 246 to the outlet shell end 240a. In the open position, the first portion 248 of the first side wall 246 of the first shell 229a may be in edge-sharing contact with the directly adjacent first portion 248 of the first side wall 246 of the second shell 229b. The arms 209 of the bar mechanism 203, attached at the second ends 213 to the pair of shells 229 of the VID 210, may be perpendicular to the connecting bar 207 of the bar mechanism 203.

When the VID 210 is configured in the open position as described above, the inner surfaces of the pair of shells 229 create little to no flow restriction through the VID 210. In contrast, when the VID 210 is in the closed position, as shown in FIG. 2B, the geometry of the inner channel formed by the pair of shells 229 acts as a constriction in the path of gas flow, as indicated by the arrow 214. In the closed position, the arms 209 of the bar mechanism 203 may rotate so that the arms 209 form acute angles relative to the connecting bar 207. Accordingly, the pair of shells 229 of the VID 210, attached to the second ends 213 of the arms 209, may pivot at the set of hinges 233, so that the first and second outlet shell ends 240a and 240b move toward the central axis 212 of the compressor 201. The outer surfaces 228 of the pair of shells 229 may no longer be in face-sharing contact with the inner wall 230 of the inlet conduit 216, but the VID 210 may maintain contact with the inner wall 230 at the set of hinges 233 and the base 231. The pivoting of the shells 229 may alter the alignment of the pair of shells 229 relative to one another, resulting in the edge-sharing contact between the second portion 250 of the first side wall 246 of the first shell 229a and the directly adjacent second portion 250 of the first side wall 246 of the second shell 229b.

When pivoted into the closed position, the first and second outlet shell ends 240a and 240b of the VID 210 together form a continuous, straight edge and a cross-section of the first and second outlet shell ends 240a and 240b, taken in a direction perpendicular to the central axis 212, may be annular. A diameter at the outlet end 242 may be narrower than the diameter at the inlet end 238 of the VID 210 in the closed position. The first portion 248 of the first side wall 246 of the first shell 229a is not in in edge-sharing contact with the first portion 248 of the first side wall 246 of the second shell 229b and the first portion 248 of the first side wall 246 for both the first and second shells 229a and 229b may extend outwards and away from the central axis 212 in a direction opposite to the direction of flow, indicated by arrow 214. In the closed position, the inner surfaces of the pair of shells 229 form a passage through the VID that narrows in the direction of flow, indicated by arrow 214, thereby restricting gas flow.

To illustrate the orientation of the VID 210 in the open and closed positions and how this may affect the amount of flow through the VID 210 and thus through the compressor, such as compressor 174 of FIG. 1 and 201 of FIGS. 2A-2B, the VID 210 will be discussed in greater detail in the following figure descriptions. An example of the VID 210 in FIGS. 2A-2B is provided in FIGS. 3A-3D depicting profile and front views for each configuration of the VID 210 (e.g., open and closed). The set of reference axes 202 is provided for comparison of views shown, indicating the "y" vertical direction 204, the "x" horizontal direction 206, and a "z" lateral direction 208. The central axis 212 of the VID 210 which may also be the central axis of a compressor, such as compressor 201 in FIGS. 2A-2B, in which the VID 210 may be disposed, is shown in FIGS. 3A and 3C. The direction of gas flow through the VID 210, and through the compressor, is indicated by the arrow 214. The central region 215 and side regions 217 are indicated in all representations of the VID 210 in FIGS. 3A-3D.

Starting with the most upstream elements of the VID 210, the electric motor 236, which may be in electronic communication with a controller such as controller 12 of FIG. 1, may comprise a rotor 235 and a gear 237 which operate in unison to actuate the bar mechanism 203. The bar mechanism 203, including the stem 205, the connecting bar 207, and the arms 209, may be attached at the second end 213 to the outer surfaces 228 of the pair of shells 229 of the VID 210. When the electric motor 236 receives a signal from the controller, in response to an engine operating condition, the electric motor 236 may engage the bar mechanism 203, via the rotor 235 and gear 237, to pivot the arms 209 to adjust the position of the VID 210 to afford a desired amount of flow through the compressor.

For example, upon high end engine load operation, VID 210 may be actuated in an open position as shown in FIGS. 3A-3B with the arms 209 of the bar mechanism 203 aligned perpendicular to the connecting bar 207. As shown in FIG. 3A, the plane along the horizontal direction 206 of the outer surfaces 228 of the pair of shells 229 of the VID 210 may be parallel with the central axis 212. A first portion 248a of a first side wall 246a of the first shell 229a and a first portion 248b of a first side wall 246b of a second shell 229b may be coaxial with the central axis 212. As such, the first portion 248a of the side wall 246a of the first shell 229a may be in edge-sharing contact with the first portion 248b of the side wall 246b of the second shell 229b. A second portion 250a of the side wall 246a of the first shell 229a and a second portion 250b of the side wall 246b of the second shell 229b may be angled with respect to the central axis 212 so that the second portions 250a and 250b are tilted outwards and away from the central axis 212 along the direction of gas flow, as indicated by arrow 214. A set of two gaps, represented by arrows 252, may be positioned between the outlet shell end 240a of the first shell 229a and the outlet shell end 240b of the second shell 229b. The planes formed by the outlet shell end 240a of the first shell 229a and the outlet shell end 240b of the second shell 229b, along the vertical direction 204, are tilted with respect to the vertical direction 204 when the VID 210 is in the open position, depicted in FIG. 2A. In contrast, the planes formed by the inlet shell end 244a of the first shell 229a and the inlet shell end 244b of the second shell 229b, along the vertical direction 204, are aligned with the vertical direction 204 and may form a continuous straight edge.

The entirety of the pair of shells 229 may be movable except for the region where the set of hinges 233 attaches the pair of shells 229 to the base 231 of the VID 210. The set of hinges 233 may be disposed at a central point along the inlet shell edge 244a of the first shell 229a and along the inlet shell edge 244b of the second shell 229b, where the inlet shell ends 244a and 244b join with the outer surfaces 228 of the pair of shells 229. The set of hinges 233 may be fulcrums about which the pair of shells 229 may be rotated. The base 231, to which the set of hinges 233 may be fixed, may be a ring centered around the central axis 212 and may have a diameter slightly larger than the diameter of the ring formed by the adjacent arrangement of the inlet shell end 244a of the first shell 229a with the inlet shell end 244b of the second shell 229b, as seen in FIG. 3B. The pair of shells 229 may be relatively thin with an outer diameter 254 of the pair of shells 229 (when in the open configuration) slightly wider than an inner diameter 256 of the pair of shells 229 (when in the open configuration), where slightly wider may include wider by a thickness of the walls of the pair of shells 229 (e.g., a half a centimeter or less). An inner diameter of an inner passage 258 at the inlet shell ends 244a and 244b, also the inlet end 238, has a same inner diameter of the inner passage 258 at the outlet shell ends 240a and 240b, also the outlet end 242, when the VID 210 is in the open configuration, thus a plurality of inner surfaces 260 of the pair of shells 229 may form a uniform, smooth annular channel within the VID 210.

As described above, the VID 210 may be actuated into the open position during high engine loads. When the conditions change so that the engine, such as engine 5 of FIG. 1, experiences light engine operating loads, the controller, with reference to controller 12 of FIG. 1, may signal the electric motor 236 to pivot the VID 210 into the closed position, such as shown in FIGS. 3C-3D. Discussion of the VID 210 in the closed position will begin with the actuating mechanism, the most upstream element. In this orientation, the arms 209 of the bar mechanism 203 may be angled so that the second ends 213 are closer to the central axis 212 than the first ends 211 and the arms 209 form acute angles with the connecting bar 207. The angling of the arms 209 may result in the tilting of the pair of shells 229, as shown in FIG. 3C, relative to the open position shown in FIG. 3A.

Continuing along the path of flow through the VID 210, the pivoting of the pair of shells 229 at the set of hinges 233 into the closed position may cause the inlet shell end 244a of the first shell 229a and the inlet shell end 244b of the second shell 229b to slide within the opening of the base 231 of the VID 210, as shown in FIG. 3C. This is enabled by the configuration of the base 231 to be annular with an inner diameter that is slightly larger than the outer diameter of the inlet end 238 of the VID 210, allowing the inlet shells ends 244a and 244b to move in and out of the base 231 unhindered. Upon sliding into the base 231 of the VID 210, the inlet shell ends 244a and 244b may become angled with respect to the vertical direction 204 so that the central region of the inlet shell ends 244a and 244b where the hinges 233 are disposed may be further downstream than the corners where the inlet shell end 244a joins with the first portion 248a of the side wall 246a of the first shell 229a and the inlet shell end 244b joins with the first portion 248b of the side wall 246b of the second shell 229b.

The tilting of the pair of shells 229 of the VID 210 may also result in a change in the alignment of the first shell 229a relative to the second shell 229b. The first portion 248a of the side wall 246a of the first shell 229a and the first portion 248b of the side 246b of the second shell 229b may be angled relative to the central axis 212 so that the first portions 248a and 248b angle away from the central axis 212 at the inlet end 238 of the VID 210. The second portion 250a of the side wall 246a of the first shell 229a may be in edge-sharing contact with the second portion 250b of the side wall 246b of the second shell 229b. The shared edge between the second portions 250a and 250b of the side walls 246a and 246b of the pair of shells 229 may be coaxial with the central axis 212. The outlet shell end 240a of the first shell 229a and the outlet shell end 240b of the second shell 229b may form a continuous edge when in the closed position, as seen in FIG. 3C, that is perpendicular to the central axis 212.

The pivoting of the pair of shells 229 of the VID 210 in the closed position may angle the outer surfaces 228 of the pair of shells 229, with respect to the central axis 212, so that the diameter 264 of the outlet end 242 is narrower than the diameter 262 of the inlet end 238 when the VID 210 is in the closed position, as shown in FIG. 3D. The inner passage 258 created by the inner surfaces, with reference to the inner surfaces 260 of FIG. 3B, of the pair of shells 229, is a smooth, annular channel that is wider at the inlet of the channel than the outlet. In this way, when actuated into the closed position, the pair of shells 229 may be pivoted so that the inner passage 258 of the VID 210 narrows along the direction of gas flow, as indicated by arrow 214, thereby restricting the flow through the VID 210 and through the inlet conduit 216 of the compressor. This may prevent the accumulation of pressure at the outlet end of the compressor that typically leads to undesirable surge conditions.

Figure 4:
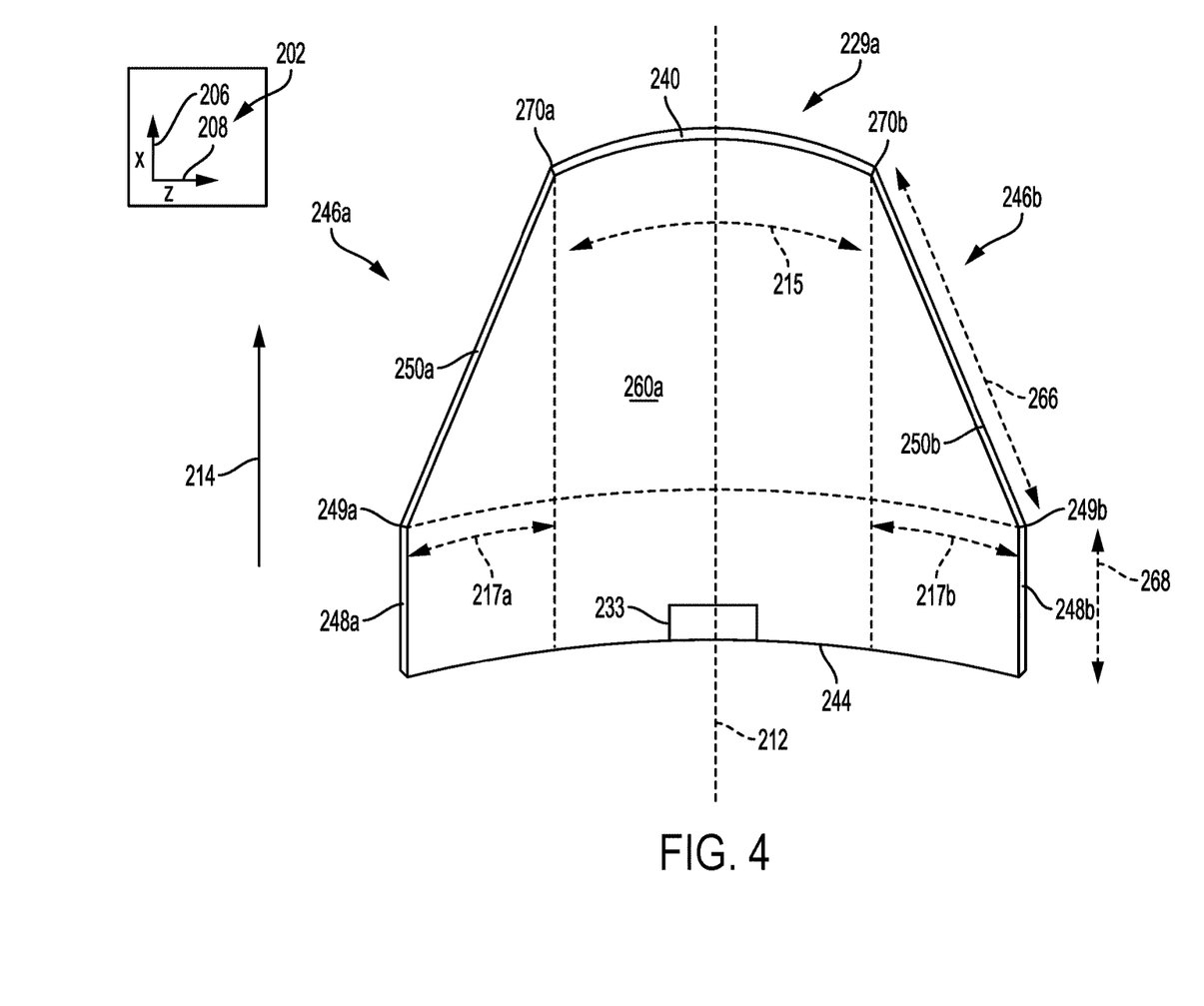
FIG. 4 shows an isometric view of a shell of a variable inlet device.

Turning now to FIG. 4, a different perspective view of the shell 229a, which may be similarly configured to the second shell 229b of VID 210, is shown. The set of reference axes 202 is provided for comparison of views shown, indicating the "x" horizontal direction 206, and the "z" lateral direction 208. The direction of gas flow, through both the VID and a compressor, such as compressor 172 of FIG. 1 and 201 of FIGS. 2A-2B, is given by the arrow 214 and the central axis 212 of the compressor is depicted about which the shell 229a is mirror symmetric.

Beginning with elements closest to the central axis 212, the central region 215 extends along the horizontal direction 206 from an inlet end to an outlet end of the VID, with reference to the inlet end 238, outlet end 242, and VID 210 of FIGS. 2A-3D. An outlet end of the central region 215 is also the outlet shell end 240 and an inlet end of the central region 215 is a central portion of the inlet shell end 244. The central region 215 has a rectangular outline with a curved inner surface 260a matched by a curved outer surface, such as the outer surfaces 228 of the pair of shells 229 as shown in FIGS. 2A-3D. A thickness of the central region 215, as measured in the horizontal direction 206, may be relatively thin compared to a length and width, measured along the horizontal 206 and lateral 208 directions respectively, of the central region 215. For example, the thickness may be 5% of the length of the central region. One hinge of the set of hinges 233 may be centrally disposed along the inlet shell end 244 of the shell 229a, acting as a fulcrum about which the shell 229a may be pivoted.

Moving in a direction outwards from the central axis 212, a first side regions 217a and a second side region 217b may be arranged on either side central region 215 and spaced away from one another by the central region 215. The first side region 217a may have a first side wall 246a and the second side region 217b may have a second side wall 246b, each sidewall 246a and 246b comprising two portions. A first portion 248a of the first sidewall 246a is upstream of a second portion 250a of the first side wall 246a and a first portion 248b of the second sidewall 246b is upstream of a second portion 250b of the second side wall 246b. The first portion 249a of the first side wall 246a has an end-point that is a mid-point 249a along the height, relative to the horizontal direction 206, of the shell 229a, and similarly, the first portion 248b of the second side wall 246b has an end-point that is a mid-point 249b along the height of the shell 229a. Both first portions 249a and 249b of the first and second side walls 246a and 246b, respectively, may extend from the inlet shell end 244, upwards in a direction that is coaxial with the central axis 212. The second portion 250a extends from the mid-point 249a of the first side wall 246a to a first end 270a of the outlet shell end 240 and the second portion 250b extends from the mid-point 249b of the second side wall 246b to a second end 270b of the outlet shell end 240. The second portions 250a and 250b are angled relative to the central axis 212 and the distance between the first end 270a and second end 270b of the outlet shell end 240 is shorter than the distance between the mid-points 249a and 249b of the first and second sidewalls 246a and 246b. A length of the both of the second portions 250a and 250b of the first and second side walls 246a and 246b, represented by an arrow 266, is longer than a length of the first portions 248a and 248b of the first and second side walls 246a and 246b, as represented by an arrow 268.

The inner surface 260a, comprising half of the inner surfaces 260 depicted in FIG. 3B, extends across the side regions 217a and 217b, along the lateral direction 208, so that the inner surface 260a is smooth and continuous between the two side walls 246a and 246b and the inlet shell end 244 and outlet shell end 240. As well, a thickness of both of the side regions 217a and 217b may be a same thickness as the central region 215, which is relatively thin compared to the length and width, measured in the horizontal 206 and lateral 208 directions respectively, of the shell 229a. Thus, the combination of the smooth, uninterrupted inner surface 260 and the relative thinness of the shell 229a result in minimal restriction to gas flow through the VID, such as VID 210 of FIGS. 2A-3D, when the VID is in the open position in the inlet conduit of the compressor.

FIGS. 2A-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact or edge-sharing contact with each other may be referred to as in face-sharing or edge-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 5, a flow chart of a method 500 for controlling operation (e.g., controlling a position) of a variable inlet device positioned in an inlet conduit of a compressor is shown. Specifically, the variable inlet device (VID) may be VID 210 shown in FIGS. 2A-3D. The VID may be positioned in an inlet conduit of a compressor, upstream of an impeller, such as the VID 210 shown in FIGS. 2A-2B. Instructions for carrying out method 600 and the rest of the methods included herein may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may employ an electric motor coupled to a bar mechanism with pivotable arms to adjust the VID between an open position (as shown in FIGS. 2A, 3A, and 3B) and a closed position (as shown in FIGS. 2B, 3C, and 3D). An example of such an actuator coupled to the VID is shown in FIGS. 2A-3D, as described above.

At 502, the method includes estimating and/or measuring engine operating conditions. Engine operating conditions may include engine speed, engine load, engine temperatures (such as engine coolant temperature), mass air flow to the engine, intake manifold pressure, a pressure differential across a compressor, a mass air flow rate through the compressor, a position of the VID, etc.

At 504, the method includes determining whether current engine operation is below a surge threshold. Current engine operation below a surge threshold may include a current (e.g., currently determined) engine load and engine speed being below a surge line or threshold. For example, a map of engine load vs. engine speed, such as map 600 shown in FIG. 6, may be stored in a memory of the controller. Looking at FIG. 6, map 600 includes an operational boundary line 602. All the possible engine speed and engine load operational points of the engine may be contained within the axes and operational boundary line 602. The map 600 also includes a surge threshold line 604. When the engine is operating at an engine speed and engine load point that falls below, or to the left, of the surge threshold line 604, the likelihood of compressor surge may be increased relative to when the engine is operating at an engine speed and engine load point that falls above, or to the right, of the surge threshold line 604. Map 600 includes two areas: a first area 606 which is below, or to the left of, the surge threshold line 604 and a second area 608 which is above, or to the right of, the surge threshold line 604. As explained further below, when the engine is operating at an engine speed and engine load point that falls within the first area 606, the engine may be operating under a lighter load condition and the controller may actuate the VID to be in the closed position. Conversely, when the engine is operating at an engine speed and engine load point that falls within the second area 608, the engine may be operating under a higher load condition and the controller may actuate the VID to be in the open position. In alternate embodiments, instead of a map of engine speed and engine load, the controller may utilize a map of compressor conditions, such as differential pressure across the compressor and mass air flow through the compressor relative to a surge line to determine which position to adjust the VID into.

Returning to FIG. 5, at 504, the controller may determine whether the engine is operating below the surge threshold using a stored map or look-up table similar to that of map 600 shown in FIG. 6. For example, the controller may determine the current engine speed and engine load and then look up whether this operating point is above or below the surge threshold. In one example, the surge threshold may be a pre-set surge threshold stored in the map or look-up table. If the engine is not operating below the surge threshold (e.g., the current engine speed and load point is in the second area 608 shown in map 600), the method continues to 506 to open the VID. Opening the VID may include the controller sending an electronic signal to an actuator of the VID (such as the electric motor 236 and bar mechanism 203 shown in FIGS. 2A-3D) to either adjust the VID from the closed position to the open position or to maintain the VID in the open position. The open position of the VID is shown in FIGS. 2A, 3A, and 3B, as described above. As explained above with reference to these figures, in the open position, an inner surface of the VID does not restrict flow through the VID, from an inlet end to outlet end of the VID. Adjusting the VID from the closed position to the open position may include pivoting a pair of semi-cylindrical shells of the VID, via the actuator coupled to the hinges of the shells, in a direction relative to a central axis of the compressor (about which the impeller rotates) so that the outer surfaces of the shells are in face-sharing contact with the inner walls of the inlet conduit, and a diameter of the outlet end of the VID increases.

Alternatively at 504, if the engine is operating below the surge threshold (e.g., the current engine speed and load point is in the first area 606 shown in map 600), the method continues to 508 to close the VID. Closing the VID may include the controller sending an electronic signal to the actuator of the VID to either adjust the VID from the open position to the closed position or to maintain the VID in the closed position. The closed position of the VID is shown in FIGS. 2B, 3C, and 3D, as described above. As explained above with reference to these figures, in the closed position, the inner surface of the VID narrows along a length of the VID. Adjusting the VID from the open position to the closed position may include pivoting each shell of the VID, via the actuator coupled to hinges of the shells, so that the outlet end of each shell pivots toward the central axis of the compressor.

In this way, a variable inlet device (VID) positioned within an inlet conduit of a compressor, upstream of an impeller of the compressor, may be used to adjust the flow through the inlet conduit and to the impeller. The VID may include a pair of adjacently arranged semi-cylindrical shells with the inner passage of the VID aligned with a central, rotational axis of the compressor. Each shell includes an inlet end arranged upstream from an outlet end, where each shell is adapted to pivot about a hinge disposed centrally along the inlet end of the shell. In one example, the VID may be adjusted into an open position where the outer surfaces of the shells are in face-sharing contact with the inner walls of the inlet conduit and the inner diameter of the flow passage of the VID is uniform from the inlet end to the outlet end. In this way, flow restriction through the VID and to the impeller may be minimized, thereby increasing compressor performance in this position. In another example, the VID may be adjusted into a closed position where the outlet ends of the shells are pivoted toward the central, rotational axis, creating a narrowing path through the VID from the inlet to outlet end that restricts flow through the VID and increases the surge margin. The technical effect of adjusting the VID into the closed position under lighter load conditions is to increase compressor efficiency while reducing the likelihood of surge. The technical effect of adjusting the VID into the open position under higher load conditions is to reduce flow restriction to the impeller, thereby improving compressor performance.

As an embodiment, a compressor includes: an impeller rotatable about a central axis; and a variable inlet device (VID) positioned in an inlet conduit upstream of the impeller, and including two semi-cylindrical shells having inner surfaces forming an inner flow passage through the VID aligned with the central axis, each of the two shells being pivotable between open and closed positions about a set of hinges arranged at an inlet end of the VID. In a first example of the compressor, an actuator is coupled to the two shells and adapted to actuate the VID into the open and closed positions, the actuator including an electric motor coupled to two pivotable arms, each arm of the two pivotable arms coupled to an outer surface of a respective shell of the two shells. A second example of the compressor optionally includes the first example and further includes, wherein outer surfaces of the two shells are arranged adjacent to an inner wall of the inlet conduit. A third example of the compressor optionally includes one or more of the first and second examples, and further includes, wherein the inlet end of the VID is formed by a first inlet end of a first shell of the two shells and a second inlet end of a second shell of the two shells, the VID further including an outlet end formed by a first outlet end of the first shell and a second outlet end of the second shell, wherein the inlet end of the VID is arranged upstream of the outlet end of the VID, and wherein the flow passage is formed within the inner surfaces of the two shells, between the inlet end and outlet end of the VID. A fourth example of the compressor optionally includes one or more of the first through third examples, and further includes, wherein the first shell has a first central region that extends in a straight line from the first inlet end to the first outlet end, and a first side region arranged on an opposite side of the first central region from a second side region, the first and second side regions spaced apart from one another by the first central region, and wherein the second shell has a second central region that extends in a straight line from the second inlet end to the second outlet end, and a third side region arranged on an opposite side of the second central region from a fourth side region, the third and fourth side regions spaced apart from one another by the second central region. A fifth example of the compressor optionally includes one or more of the first through fourth examples, and further includes, wherein the first side region of the first shell has a first side wall and the second side region of the first shell has a second side wall, and the first and second side walls each have a first straight portion extending from the first inlet end to a first mid-point of the first shell and each of the first and second side walls has a first angled portion extending from the first mid-point to the first outlet end, wherein the first angled portion of each of the first and second side walls connects a corresponding first straight portion to the first outlet end, wherein the third side region of the second shell has a third side wall and the fourth side region of the second shell has a fourth side wall, and the third and fourth side walls each have a second straight portion extending from the second inlet end to a second mid-point of the second shell and each of the third and fourth side walls has a second angled portion extending from the second mid-point to the second outlet end, wherein each second angled portion connects a corresponding second straight portion to the second outlet end. A sixth example of the compressor optionally includes one or more of the first through fifth examples, and further includes, wherein each angled portion is longer than each straight portion. A seventh example of the compressor optionally includes one or more of the first through sixth examples, and further includes, wherein the first central region and the first and second side regions of the first shell create continuous and curved outer and inner surfaces of the first shell, and the second central region and the third and fourth side regions of the second shell create continuous and curved outer and inner surfaces of the second shell. A eighth example of the compressor optionally includes one or more of the first through seventh examples, and further includes, wherein in the open position, outer surfaces of the two shells are in face-sharing contact with an inner wall of the inlet conduit and each first straight portion of the first shell is in edge-sharing contact with a corresponding second straight portion of the second shell. A ninth example of the compressor optionally includes one or more of the first through eighth examples, and further includes, wherein in the closed position, each outlet end of the two shells are pivoted inwards towards the central axis, away from an inner wall of the inlet conduit and each first angled portion of the first shell is in edge-sharing contact with a corresponding second angled portion of the second shell. A tenth example of the compressor optionally includes one or more of the first through ninth examples, and further includes, wherein in the closed position the inlet end of the VID has a larger diameter than the outlet end of the VID. An eleventh example of the compressor optionally includes one or more of the first through tenth examples, and further includes, wherein a first hinge of the set of hinges is arranged at a mid-point of the first inlet end of the first shell and attaches the first inlet end to a base of the VID, and wherein a second hinge of the set of hinges is arranged at a mid-point of the second inlet end of the second shell and attaches the second inlet end to the base.

As an embodiment, a method includes: actuating pivotable arms of an actuator to adjust a variable inlet device (VID) coupled to the pivotable arms, the VID adjusted between an open position where an inner surface of the VID does not restrict flow from an inlet end to an outlet end of the VID and a closed position where the inner surface narrows along a length of the VID and restricts flow through the VID, the VID positioned in and across an inlet conduit of a compressor, upstream of an impeller, the actuating based on operation of an engine relative to a surge threshold of the compressor. In a first example of the method, the VID includes a set of adjacently arranged semi-cylindrical shells forming a ring around a central axis of the compressor, where inner surfaces of the adjacently arranged shells form the inner surface of the VID and a flow passage through the VID. A second example of the method optionally includes the first example and further includes, wherein the operation of the engine relative to the surge threshold of the compressor comprises the engine transitioning to operating at an engine speed and engine load that is below the surge threshold, and wherein actuating the pivotable arms to adjust the VID between the open and closed position includes pivoting the pivotable arms toward one another and the central axis to adjust the VID from the open position to the closed position. A third example of the method optionally includes one or more of the first and second examples, and further includes, wherein each shell of the adjacently arranged shells includes an inlet end and an outlet end, each inlet end arranged upstream from each outlet end in the inlet conduit and wherein adjusting the VID from the open position to the closed position includes pivoting each shell so that each outlet end of each shell pivots towards the central axis. A fourth example of the method optionally includes one or more of the first through third examples, and further includes, wherein the operation of the engine relative to the surge threshold of the compressor comprises the engine transitioning to operating at an engine speed and engine load that is above the surge threshold, and wherein actuating the pivotable arms to adjust the VID between the open position and closed position includes pivoting the pivotable arms away from one another and the central axis to adjust the VID from the closed position to the open position. A fifth example of the method optionally includes one or more of the first through fourth examples, and further includes, wherein adjusting the VID from the closed position to the open position includes pivoting the set of adjacently arranged shells in a direction relative to the central axis to increase a diameter of the outlet end of the VID.

As an embodiment, a system for an engine includes: a compressor including an impeller rotatable about a central axis and a variable inlet device (VID) arranged upstream of the impeller in an inlet conduit of the compressor, the VID comprising: a set of semi-cylindrical shells arranged adjacent to one another, each shell of the set of shells having an inlet end arranged upstream in the inlet conduit from an outlet end, where each shell is pivotable, from its inlet end to its outlet end, relative to the central axis; and an actuator adapted to actuate the VID into an open and closed position, the actuator including an electric motor coupled to two pivotable arms, each arm of the two pivotable arms coupled to an outer surface a respective shell of the two shells; and a controller including computer readable instructions stored on memory for: actuating the electric motor to pivot the pivotable arms toward the central axis and move each outlet end of each shell inward, toward the central axis, to move the VID into the closed position in response to a first operating condition; and actuating the electric motor to pivot the pivotable arms away from the central axis and move each outlet end of each shell outward, away from the central axis, to move the VID into the open position in response to a second operating condition. In a first example of the method, the first operating condition includes operation of the engine below a surge threshold of the compressor and the second operating condition includes operation of the engine above the surge threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
a compressor including an impeller rotatable about a central axis and a variable inlet device (VID) arranged upstream of the impeller in an inlet conduit of the compressor, the VID comprising:
a set of semi-cylindrical shells arranged adjacent to one another, each shell of the set of shells having an inlet end arranged upstream in the inlet conduit from an outlet end, where each shell is pivotable, from its inlet end to its outlet end, relative to the central axis; and
an actuator adapted to actuate the VID into an open and closed position, the actuator including an electric motor coupled to two pivotable arms, each arm of the two pivotable arms coupled to an outer surface a respective shell of the two shells; and
a controller including computer readable instructions stored on memory for:
actuating the electric motor to pivot the pivotable arms toward the central axis and move each outlet end of each shell inward, toward the central axis, to move the VID into the closed position in response to a first operating condition; and
actuating the electric motor to pivot the pivotable arms away from the central axis and move each outlet end of each shell outward, away from the central axis, to move the VID into the open position in response to a second operating condition.

2. The system of claim 1, wherein the first operating condition includes operation of the engine below a surge threshold of the compressor and the second operating condition includes operation of the engine above the surge threshold.

3. A compressor, comprising:
an impeller rotatable about a central axis; and
a variable inlet device (VID) positioned in an inlet conduit upstream of the impeller, and including two semi-cylindrical shells having inner surfaces forming an inner flow passage through the VID aligned with the central axis, each of the two shells being pivotable between open and closed positions about a set of hinges arranged at an inlet end of the VID.

4. The compressor of claim 3, further comprising an actuator coupled to the two shells and adapted to actuate the VID into the open and closed positions, the actuator including an electric motor coupled to two pivotable arms, each arm of the two pivotable arms coupled to an outer surface of a respective shell of the two shells.

5. The compressor of claim 3, wherein outer surfaces of the two shells are arranged adjacent to an inner wall of the inlet conduit.

6. The compressor of claim 3, wherein the inlet end of the VID is formed by a first inlet end of a first shell of the two shells and a second inlet end of a second shell of the two shells, the VID further including an outlet end formed by a first outlet end of the first shell and a second outlet end of the second shell, wherein the inlet end of the VID is arranged upstream of the outlet end of the VID, and wherein the flow passage is formed within the inner surfaces of the two shells, between the inlet end and outlet end of the VID.

7. The compressor of claim 6, wherein the first shell has a first central region that extends in a straight line from the first inlet end to the first outlet end, and a first side region arranged on an opposite side of the first central region from a second side region, the first and second side regions spaced apart from one another by the first central region, and wherein the second shell has a second central region that extends in a straight line from the second inlet end to the second outlet end, and a third side region arranged on an opposite side of the second central region from a fourth side region, the third and fourth side regions spaced apart from one another by the second central region.

8. The compressor of claim 7, wherein the first side region of the first shell has a first side wall and the second side region of the first shell has a second side wall, and the first and second side walls each have a first straight portion extending from the first inlet end to a first mid-point of the first shell and each of the first and second side walls has a first angled portion extending from the first mid-point to the first outlet end, wherein the first angled portion of each of the first and second side walls connects a corresponding first straight portion to the first outlet end, wherein the third side region of the second shell has a third side wall and the fourth side region of the second shell has a fourth side wall, and the third and fourth side walls each have a second straight portion extending from the second inlet end to a second mid-point of the second shell and each of the third and fourth side walls has a second angled portion extending from the second mid-point to the second outlet end, wherein each second angled portion connects a corresponding second straight portion to the second outlet end.

9. The compressor of claim 8, wherein each angled portion is longer than each straight portion.

10. The compressor of claim 6, wherein the first central region and the first and second side regions of the first shell create continuous and curved outer and inner surfaces of the first shell, and the second central region and the third and fourth side regions of the second shell create continuous and curved outer and inner surfaces of the second shell.

11. The compressor of claim 10, wherein in the open position, outer surfaces of the two shells are in face-sharing contact with an inner wall of the inlet conduit and each first straight portion of the first shell is in edge-sharing contact with a corresponding second straight portion of the second shell.

12. The compressor of claim 10, wherein in the closed position, each outlet end of the two shells are pivoted inwards towards the central axis, away from an inner wall of the inlet conduit and each first angled portion of the first shell is in edge-sharing contact with a corresponding second angled portion of the second shell.

13. The compressor of claim 6, wherein in the closed position the inlet end of the VID has a larger diameter than the outlet end of the VID.

14. The compressor of claim 3, wherein a first hinge of the set of hinges is arranged at a mid-point of the first inlet end of the first shell and attaches the first inlet end to a base of the VID, and wherein a second hinge of the set of hinges is arranged at a mid-point of the second inlet end of the second shell and attaches the second inlet end to the base.

15. A method, comprising:
actuating pivotable arms of an actuator to adjust a variable inlet device (VID) coupled to the pivotable arms, the VID adjusted between an open position where an inner surface of the VID does not restrict flow from an inlet end to an outlet end of the VID and a closed position where the inner surface narrows along a length of the VID and restricts flow through the VID, the VID positioned in and across an inlet conduit of a compressor, upstream of an impeller, the actuating based on operation of an engine relative to a surge threshold of the compressor.

16. The method of claim 15, wherein the VID includes a set of adjacently arranged semi-cylindrical shells forming a ring around a central axis of the compressor, where inner surfaces of the adjacently arranged shells form the inner surface of the VID and a flow passage through the VID.

17. The method of claim 16, wherein the operation of the engine relative to the surge threshold of the compressor comprises the engine transitioning to operating at an engine speed and engine load that is below the surge threshold, and wherein actuating the pivotable arms to adjust the VID between the open and closed position includes pivoting the pivotable arms toward one another and the central axis to adjust the VID from the open position to the closed position.

18. The method of claim 17, wherein each shell of the adjacently arranged shells includes an inlet end and an outlet end, each inlet end arranged upstream from each outlet end in the inlet conduit and wherein adjusting the VID from the open position to the closed position includes pivoting each shell so that each outlet end of each shell pivots towards the central axis.

19. The method of claim 16, wherein the operation of the engine relative to the surge threshold of the compressor comprises the engine transitioning to operating at an engine speed and engine load that is above the surge threshold, and wherein actuating the pivotable arms to adjust the VID between the open position and closed position includes pivoting the pivotable arms away from one another and the central axis to adjust the VID from the closed position to the open position.

20. The method of claim 19, wherein adjusting the VID from the closed position to the open position includes pivoting the set of adjacently arranged shells in a direction relative to the central axis to increase a diameter of the outlet end of the VID.

* * * * *